United States Patent [19]

Kivari

[11] Patent Number: 5,752,201

[45] Date of Patent: May 12, 1998

[54] MOBILE TERMINAL HAVING POWER SAVING MODE THAT MONITORS SPECIFIED NUMBERS OF FILLER MESSAGES

[75] Inventor: Raimo Kivari, Haukipudas, Finland

[73] Assignee: Nokia Mobile Phones Limited, Salo, Finland

[21] Appl. No.: 599,144

[22] Filed: Feb. 9, 1996

[51] Int. Cl.$^6$ .............................. H04B 1/38; H04M 1/00

[52] U.S. Cl. .................................. 455/574; 455/343

[58] Field of Search ................................ 455/343, 38.3, 455/54.1, 33.1, 422, 425, 517, 67.1, 550, 574, 575; 370/311; 340/825.44

[56] References Cited

U.S. PATENT DOCUMENTS

| | | | |
|---|---|---|---|
| 4,029,900 | 6/1977 | Addeo | 178/69.1 |
| 4,592,076 | 5/1986 | El-Banna | 375/108 |
| 4,777,655 | 10/1988 | Numata et al. | 455/76 |
| 4,903,319 | 2/1990 | Kasai et al. | 455/33 |
| 5,027,428 | 6/1991 | Ishiguro et al. | 455/67 |
| 5,031,231 | 7/1991 | Miyazaki | 455/54 |
| 5,175,874 | 12/1992 | Auchter | 455/89 |
| 5,224,152 | 6/1993 | Harte | 379/59 |
| 5,241,542 | 8/1993 | Natarajan et al. | 455/343 |
| 5,265,270 | 11/1993 | Stengel et al. | 455/343 |
| 5,291,542 | 3/1994 | Kivari et al. | 379/58 |
| 5,293,639 | 3/1994 | Wilson et al. | 455/17 |
| 5,396,653 | 3/1995 | Kivari et al. | 455/88 |
| 5,471,655 | 11/1995 | Kivari | 455/127 |
| 5,551,078 | 8/1996 | Connell et al. | 455/343 |
| 5,566,357 | 10/1996 | Holcman | 455/38.3 |
| 5,568,513 | 10/1996 | Croft et al. | 455/38.3 |

FOREIGN PATENT DOCUMENTS

WO 88/05248   4/1988   European Pat. Off. .

*Primary Examiner*—Nguyen Vo
*Attorney, Agent, or Firm*—Perman & Green, LLP

[57] ABSTRACT

A cellular telecommunications system includes at least one base station and at least one user terminal that is bidirectionally coupled to the at least one base station through an RF interface. The system further includes system circuitry for composing messages and transmitting composed messages continuously over a forward RF link to the at least one user terminal. The messages include filler messages and other messages, and the circuitry composes the messages for specifying in a transmitted message a number of filler messages that will be consecutively transmitted. The user terminal includes a receiver for receiving messages from the forward RF link and circuitry for determining a number of consecutive filler messages that will be transmitted. The user terminal further includes a controller that is responsive to a received message for placing the user terminal in a powered-down state for a period of time that is a function of the number of consecutive filler messages. In a preferred embodiment of this invention the message is repeated a plurality of times during a message frame, and the user terminal receives at least one repeat of the message. Also in a preferred embodiment of this invention, the message employs bits that are specified as reserved bits for transmitting the number of filler messages, thus making the teaching of this invention downwards compatible with existing cellular telecommunications systems, such as that specified by EIA/TIA-553 and similar systems.

16 Claims, 3 Drawing Sheets

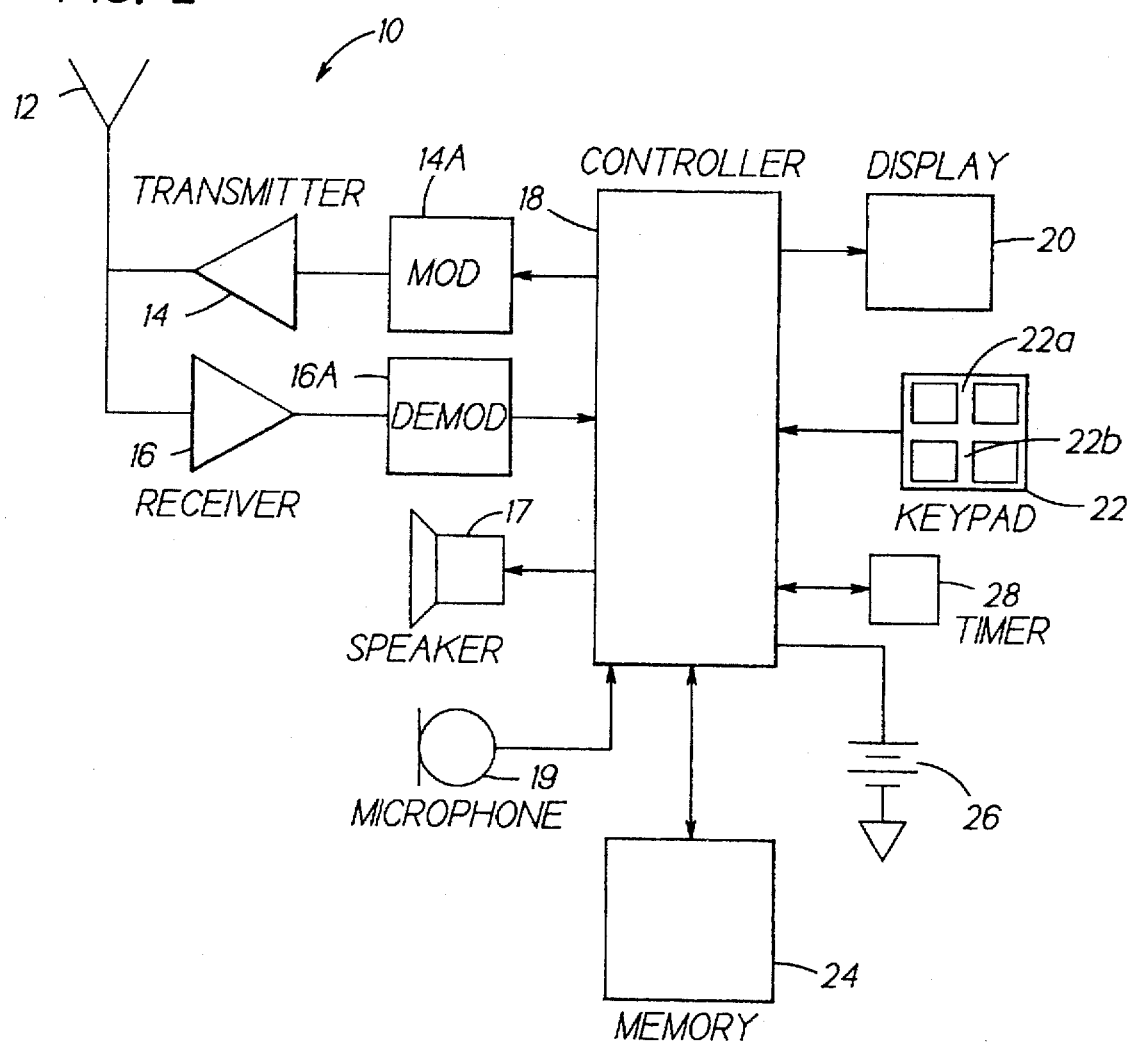

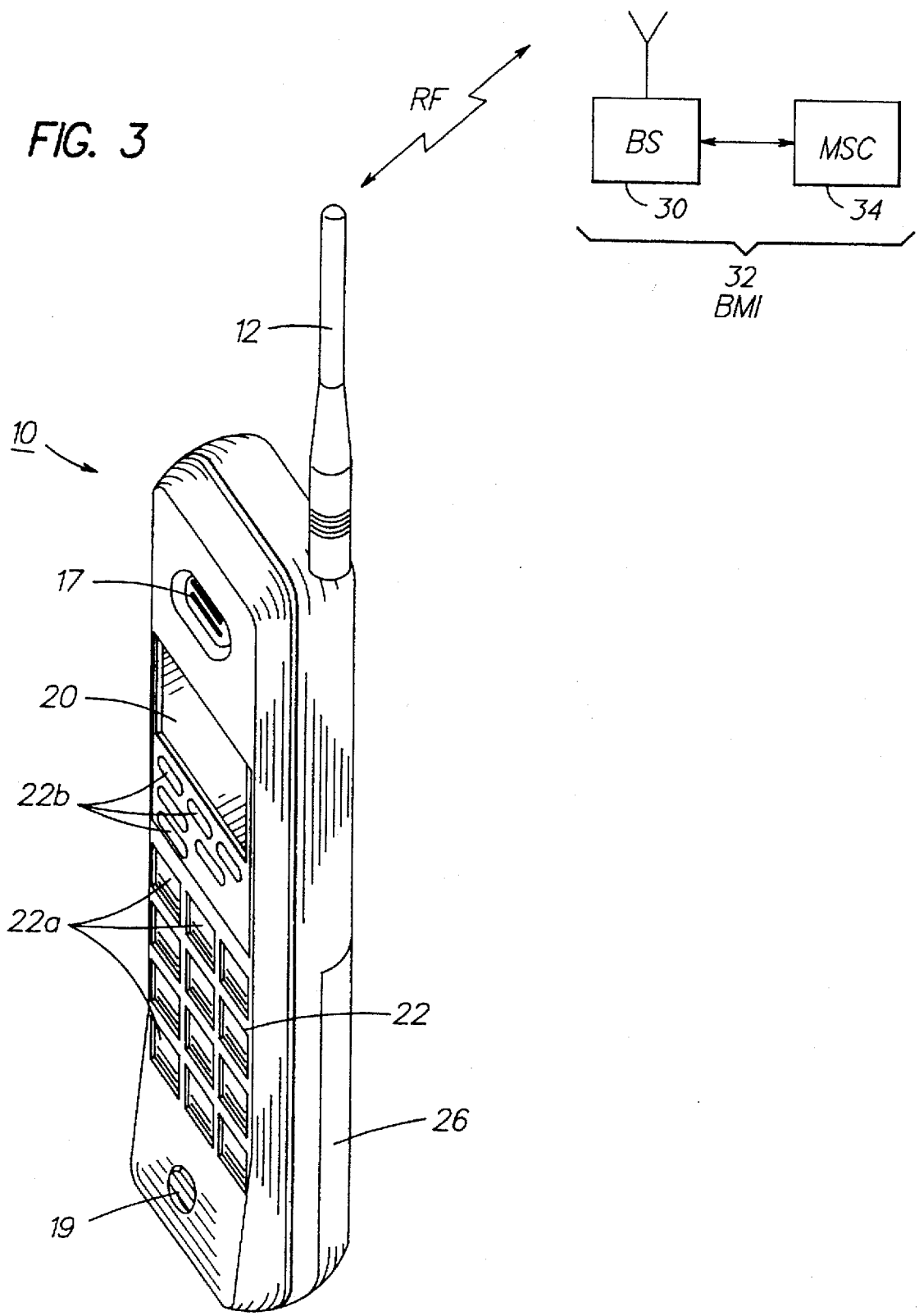

MOBILE TERMINAL HAVING POWER SAVING MODE THAT MONITORS SPECIFIED NUMBERS OF FILLER MESSAGES

FIELD OF THE INVENTION

This invention relates generally to radiotelephones and, in particular, to mobile terminals such as those capable of operation with a cellular network.

BACKGROUND OF THE INVENTION

In certain types of cellular radio communication systems, such as that specified by EIA/TIA-553, a forward analog control channel (FOCC) is a continuous wideband data stream sent from a base station to a mobile terminal or station. This data stream is generated at a 10 kilobit/second ±0.1 bit/second rate. FIG. 1 depicts the format of the FOCC data stream.

Each forward analog control channel consists of three discrete information streams, called stream A, stream B, and a busy-idle stream that are time-multiplexed together. Messages to mobile stations with the least significant bit of their mobile identification number equal to "0" are sent on stream A, and those with the least-significant bit of their mobile identification number equal to "1" are sent on stream B. Thus, a given mobile station monitors only stream A or stream B. The busy-idle stream contains busy-idle bits (shown as arrows in FIG. 1) which are used to indicate the current status of the reverse control channel. The reverse control channel is busy if the busy-idle bit is equal to "0", and idle if the busy-idle bit is equal to "1". A busy-idle bit is located at the beginning of each dotting sequence, at the beginning of each word sync sequence, at the beginning of the first repeat of word A, and after every 10 message bits thereafter.

A 10-bit dotting sequence (1010101010) and an 11-bit sync sequence (11100010010) are sent to permit mobile stations to achieve synchronization with the incoming data. Each word contains 40 bits, including parity, and is repeated five times. The repeated word is referred to as a word block or as a frame. For a multi-word message, the second word block and subsequent word blocks are formed the same as the first word block, including the 10-bit dotting and 11-bit word synchronization sequences. A word is formed by encoding 28 content bits into a (40, 28) BCH code that has a distance of 5, (40, 28; 5). The left-most bit (i.e., earliest in time) is designated as the most-significant bit. The 28 most-significant bits of the 40-bit field are defined to be the content bits. The generator polynomial for the (40, 28; 5) BCH code is:

$$g_B(x) = X^{12} + X^{10} + X^8 + X^5 + X^4 + X^3 + X^0.$$

The code, a shortened version of the primitive (63, 51; 5) BCH code, is a systematic linear block code with the leading bit as the most significant information bit and the least-significant bit as the last parity-check bit.

Each FOCC message can consist of one or more words, and can thus be transmitted over one or more frames. The types of messages transmitted over the forward control channel are mobile station control messages, overhead (OHD) messages, and control-filler messages.

A three-bit OHD field is used to identify the overhead message types. Overhead message type codes can be grouped into the following functional classes: a system parameter overhead message, a global action overhead message, a registration identification message, a control-filler message, and a digital control channel information message.

Overhead messages are sent in a group called an overhead message train (OMT). The first message of the train is the system parameter overhead message (SPOM). The desired global action messages or registration ID message or Digital Control Channel Information message are appended to the end of the system parameter overhead message. The total number of words in an overhead message train is one or more than the value of a NAWC field contained in the first word of the system parameter overhead message. The last word in the overhead message train is identified by a "1" in the END field of that word; the END field of all other words in the train is set to "0". For NAWC-counting purposes, any inserted control-filler messages are not counted as part of the overhead message train.

The system parameter overhead message (SPOM) is sent every 0.8±0.3 seconds on each of the control channels. The global action message, registration identification message and Digital Control Channel Information message are sent on an as needed basis.

Of most interest to the instant invention is the control-filler message. The control-filler message consists of one word. It is sent whenever there is no other message to be sent on the forward control channel. It may be inserted between messages, as well as between word blocks (frames) of a multi-word message. The control-filler message is chosen so then when it is sent, the 11-bit word sync sequence (11100010010) will not appear in the message stream, independent of the busy-idle bit status.

The control-filler messages are generally not needed unless the mobile station is powered up and/or if a call is to be made. Typically, 50% to 70% of received messages are filler messages. The exact number sent during any given period is a function of system loading. As more mobile stations are being serviced by the system fewer control-filler messages are transmitted, and vice versa.

The control-filler message can also be used to specify a control mobile attenuation code (CMAC) for use by mobile stations when accessing the system on the reverse control channel, and a wait-for-overhead-message bit (WFOM) indicating whether or not mobile stations must read an overhead message train before accessing the system.

In the message formats used between mobile stations and base stations, some bits are marked as reserved (RSVD). Some or all of these reserved bits are specified for future use. Therefore, all mobile stations and base stations set all bits that they are programmed to treat as reserved bits to "0" (zero) in all messages that they transmit, and ignore the state of all bits that they are programmed to treat as reserved bits in all messages that they receive.

As may be appreciated, the reception of control-filler messages consumes some amount of battery power of the mobile terminal. The conservation of battery power is an important goal in the design and operation of a mobile terminal, in particular a cellular radiotelephone.

Reference can be had to the following patents for teaching various aspects of power saving in a mobile terminal: commonly assigned U.S. Pat. Nos. 5,291,542 and 5,396,653, both by Raimo Kivari et al., and U.S. Pat. No. 5,471,655, by Raimo Kivari. Reference may also be had to U.S. Pat. Nos. 5,224,152, 5,175,874, 4,592,076 and 4,029,900.

OBJECTS OF THE INVENTION

It is thus a first object of this invention to provide a radiotelephone communication system that specifies a number of control-filler messages that are to be transmitted, and that thus enables a mobile terminal to enter a low power mode of operation during the transmission of the specified number of control-filler messages.

It is a second object of this invention to provide a mobile terminal that is responsive to information encoded within a message received from a base station for entering a low power mode of operation during the transmission of a specified number of control-filler messages.

SUMMARY OF THE INVENTION

The foregoing and other problems are overcome and the objects of the invention are realized by methods and apparatus in accordance with embodiments of this invention. A method of this invention is disclosed for operating a user terminal, such as a cellular radiotelephone, of a type that is bidirectionally coupled to a system through an RF interface. The method includes a first step of receiving a message from the system, the message specifying at least in part a number of consecutive filler messages that will be transmitted. The method includes a second step of placing the user terminal in a powered-down or a reduced power state for a period of time that is a function of the number of consecutive filler messages.

A cellular telecommunications system in accordance with this invention includes at least one base station and at least one user terminal that is bidirectionally coupled to the at least one base station through an RF interface. The system further includes system circuitry for composing messages and transmitting composed messages continuously over a forward RF link to the at least one user terminal. The messages include filler messages and other messages, and the circuitry composes the messages for specifying in a transmitted message a number of filler messages that will be consecutively transmitted.

The user terminal includes a receiver for receiving messages from the forward RF link and circuitry for determining a number of consecutive filler messages that will be transmitted. The user terminal further includes a controller that is responsive to a received message for placing the user terminal in a powered-down or a reduced power state for a period of time that is a function of the number of consecutive filler messages.

In a preferred embodiment of this invention the message is repeated a plurality of times during a message frame, and the user terminal receives at least one repeat of the message. Also in a preferred embodiment of this invention, the message employs bits that are specified as reserved bits for transmitting the number of filler messages, thus making the teaching of this invention downwards compatible with existing cellular telecommunications systems, such as that specified by EIA/TIA-553 and similar systems.

In a presently preferred embodiment of the invention the user terminal includes a programmable timer that generates an interrupt to a terminal controller, such as microprocessor, after the expiration of the period of time corresponding the number of consecutive filler messages.

In a further embodiment of this invention a cellular telecommunications system comprises at least one base station and at least one user terminal that is bidirectionally coupled to the at least one base station through an RF interface. The system includes apparatus for composing messages and for transmitting composed messages continuously over the forward RF link to the at least one user terminal. The messages include filler messages and other messages. In this embodiment the apparatus groups the messages as n consecutive filler messages and k consecutive non-filler messages. The user terminal receives the messages from the forward RF link, and includes control apparatus for placing the user terminal in a powered-down or a reduced power state for a period of time that is a function of a time required to transmit the n consecutive filler messages. In one embodiment the values of n and k are fixed, while in another embodiment the values of n and k are variable. In this latter embodiment the system apparatus is responsive to a change in value of at least one of n and k for composing and transmitting at least one message to the user terminal for indicating a current value of at least one of n and k.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 is a block diagram of a mobile terminal that is constructed and operated in accordance with this invention;

FIG. 3 is an elevational view of the mobile terminal shown in FIG. 1, and which further illustrates a cellular communication system to which the mobile terminal is bidirectionally coupled through wireless RF links;

DETAILED DESCRIPTION OF THE INVENTION

Figure 1:
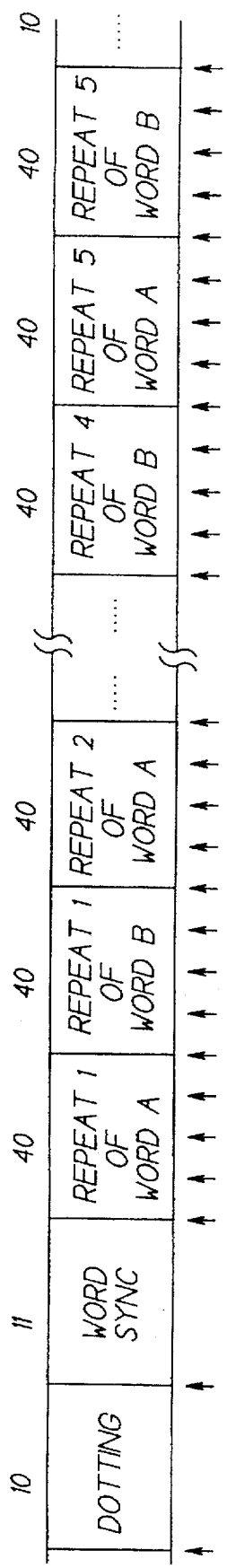
FIG. 1 illustrates a frame of information that is transmitted to a mobile terminal in accordance with the prior art.

Reference is made to FIGS. 2 and 3 for illustrating a mobile terminal 10, in particular a cellular radiotelephone, that is suitable for practicing this invention. The mobile terminal 10 includes an antenna 12 for transmitting signals to and for receiving signals from a base site or base station 30. The base station 30 is a part of a cellular network comprising a BMI 32 that includes a Mobile Switching Center (MSC) 34. The MSC 34 provides a connection to landline trunks when the mobile terminal 10 is registered with the network.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

A user interface includes a conventional speaker 17, a conventional microphone 19, a display 20, and a user input device, typically a keypad 22, all of which are coupled to the controller 18. The keypad 22 includes the conventional numeric (0-9) and related keys (#,*) 22a, and also other keys 22b used for operating the mobile terminal 10. These other keys 22b may include, by example, a SEND key, various menu scrolling and soft keys, and a PWR key.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that are received from the BMI 32 prior to the display of the messages to the user. The memory 24 also includes routines for implementing the method described below in relation to FIG. 4. The mobile terminal 10 also includes a battery 26 for powering the various circuits that are required to operate the terminal, and a timer 28 that is programmably set by the controller 18, and that generates an interrupt to the controller 18 after the expiration of the programmed interval of time. In this regard, the controller 18 is capable of entering a low power mode of operation, and is capable of staying in the low power mode until interrupted by the timer 28.

It should be understood that the mobile terminal 10 can be a vehicle mounted or a handheld device. It should further be appreciated that the mobile terminal 10 can be capable of operating with one or more air interface standards, modulation types, and access types. By example, the mobile terminal may be capable of operating in accordance with a frequency modulated (FM), frequency division multiple access (FDMA) transmission and reception standard, such as EIA/TIA-553. The terminal may also be capable of operating with any of a number of other analog or digital standards, such as GSM, EIA/TIA 627 (DAMPS), IS-136 (DDAMPS), and IS-95 (CDMA). Narrow-band AMPS (NAMPS), as well as TACS, mobile terminals may also benefit from the teaching of this invention. It should thus be clear that the teaching of this invention is not to be construed to be limited to any one particular type of mobile terminal or air interface standard.

In accordance with this invention the mobile terminal 10 is enabled to enter the reduced power or quiescent (sleep) mode to conserve battery power. The reduced power mode can include placing the controller 18 in a sleep mode, and/or selectively removing or reducing operating power to various components, such as the transmitter 14, modulator 14A, receiver 16, demodulator 16A, audio path components, the display 20, etc.

The mobile terminal 10 is responsive to a received message (e.g., an overhead or global action message) for determining if a next frame or frames convey a filler message (i.e., if all five repeats of a next frame or frames are a control-filler message). If so, the mobile terminal 10 enters the low power state (sleep mode) after setting the timer 28, which then subsequently reactivates the mobile terminal after a predetermined period of time. The predetermined period of time is equal to or less than the time required to receive the frame or frames containing the specified number of control-filler messages. If the mobile terminal 10 requires information from a control-filler message before accessing the system, such as the CMAC information, then the timer 28 may be set so as to ensure the receipt of at least one control-filler message. By example, and assuming that it was indicated in the OMT that the next six frames were all control-filler messages, then the timer 28 could be programmed to interrupt the controller prior to the start of the sixth control-filler message, thereby giving the mobile terminal 10 sufficient time to synchronize to the FOCC and to receive the sixth control-filler message. In this case significant power savings are still achieved, in that the mobile terminal 10 can operate in the low power (sleep) mode for five of the six consecutive control-filler messages.

The mobile terminal 10 may receive all five repeats of the overhead message, 3/5 majority vote the repeats, and then act on the received information. Alternatively, the mobile terminal 10 may employ a technique as described in the above-referenced commonly assigned U.S. Pat. No. 5,471, 655, the disclosure of which is incorporated herein by reference in its entirety. That is, the mobile terminal 10 can receive as a minimum only the first repeat of the message. If the first repeat is received without error, it is not then necessary to receive the next four repeats and to subsequently 3/5 majority vote the received repeats. In this case, the mobile terminal 10 is enabled to enter the sleep mode after receiving only the first repeat of a frame (assuming that the first repeat is received without error) and to then remain in the low power mode for n subsequent frames, as specified in the received first repeat of the message.

That is, and in accordance with an aspect of this invention, the mobile terminal 10 is enabled to enter a reduced power, battery power-conserving mode of operation when a received message indicates that the next n frames convey control-filler messages, where n may equal one to some arbitrarily large number.

Figure 4:
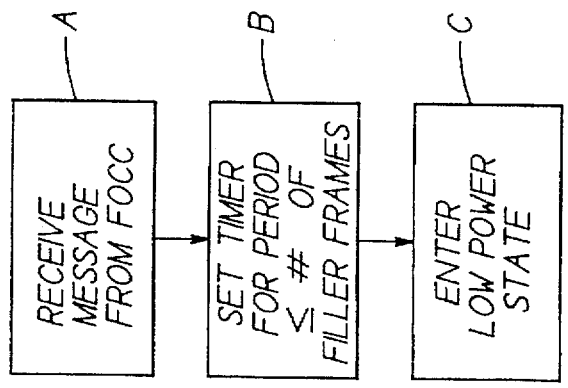
FIG. 4 is a logic flow diagram that illustrate a method executed by the mobile terminal shown in FIGS. 2 and 3.

Reference is now made to the block diagram of FIG. 4. At Block A mobile terminal receives, by example, an OMT or a global action message and stores the designated number of control-filler frames that the system indicates will be subsequently transmitted. In this regard, a control-filler message may be considered a sub-set of the OMT, and the designated number can be transmitted in a first control-filler message of a plurality of consecutive control-filler messages. That is, the mobile terminal 10 monitors received control-filler messages to locate a message having bits set that indicate that n number of next frames are also control-filler messages. By example, if specified ones of the reserved bits are zeroes, it may be assumed that the next frame is not a control-filler message frame.

At Block B the mobile terminal 10 sets the timer 28 for a period of time that is preferably less than a period of time required to receive the indicated number of control-filler frames. The period of time is made less than the total time required to receive the control-filler frames in order to allow the mobile terminal 10 a sufficient amount of time to re-enter the powered-up state, settle the receiver circuitry, and synchronize to the FOCC.

At Block C the mobile terminal enters the low power state and remains in this state until activated by an interrupt generated by the timer 28.

It is also within the scope of this invention to specify, for a multi-frame message, how many control-filler frames are interposed between the frame conveying the first part of the message and a subsequent frame conveying the second part of the message. In this case, a plurality of reserved bits that comprise the first part of the message can be employed to specify a number of intermediate control-filler message frames, and the mobile terminal 10 sets the timer 28 for a period preferably less than the indicated number of intervening control-filler message frames.

Figure 5:
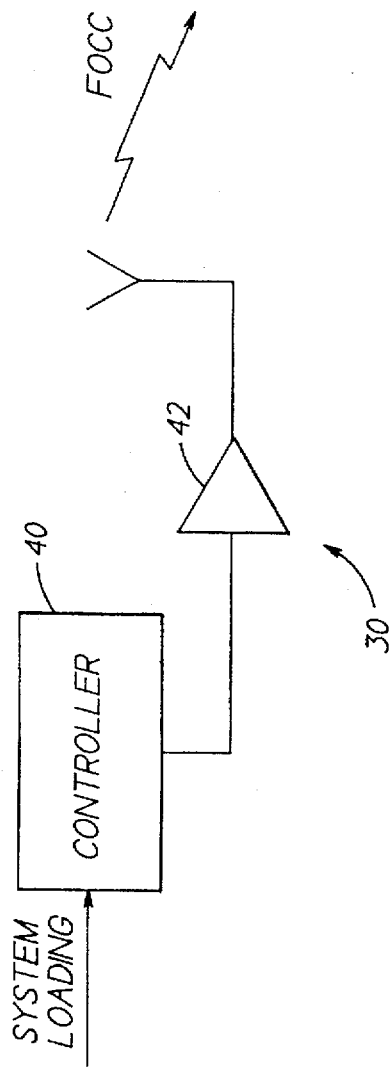
FIG. 5 is a simplified block diagram of a base station that is suitable for practicing this invention.

FIG. 5 is a block diagram of a system-level component embodied in one of the MSC 34 or base station 30 of FIG. 3.

By example, the base station 30 includes a controller 40 having an output coupled to a base station transmitter 42. The controller 40 composes the FOCC stream (FIG. 1) that is transmitted on the FOCC. In this embodiment of the invention, the controller 40 can employ a plurality of reserved bits in a message (e.g., the OMT, a global action message, a control-filler message) for specifying a number of control-filler message frames that will be consecutively transmitted to the mobile terminal 10. Specified ones of the reserved bits are set accordingly and transmitted to the mobile terminal 10 as part of a message on the FOCC.

It should be appreciated that if a mobile terminal is constructed so as to not employ the teaching of this invention, the mobile terminal will disregard the normally reserved bits. As such, the insertion of the filler message-related information into a message frame is of no consequence to a conventional mobile terminal. Thus, a radio-telephone system that is constructed in accordance with this invention can employ two types of mobile terminals, wherein one type responds to and acts upon control-filler message related information, while a second type of mobile terminal disregards the control-filler message related information.

Alternatively, a mobile terminal that is constructed in accordance with the teaching of this invention, when roaming or operating within a system that does not support the teaching of this invention, will find that the specified reserved bit(s) that indicate a number of control-filler frames are always set to zero. In this case, the mobile terminal 10 will operate in a conventional manner, and will continue to monitor the FOCC without the considerable power saving benefit made possible by this invention.

Although described in the context of a modification to an existing cellular system, such as EIA/TIA-553, so as to use previously reserved bits, it should be appreciated that the teachings of this invention can be specified from the outset when designing a cellular system.

Furthermore, a message that specifies a number of consecutively transmitted control-filler message frames need not immediately precede a control-filler frame. By example, one or more other frames may follow, each conveying all or a part of message. In this case the mobile terminal 10 can store the specified number of consecutively transmitted control-filler message frames, and continue to monitor the FOCC until the first control-filler message is detected (by example, the first correctly received repeat of the first control-filler message). At this time the mobile terminal programs the timer 28 and enters the sleep mode.

It is also within the scope of this invention to instead specify the number of non-filler messages. In this case the mobile terminal 10 counts the non-filler messages (or uses the timer 28) in order to determine when the filler messages begin and the sleep mode can be entered. In this case it is not necessary to detect the first filler message, since its location is already known.

The power saving and sleep mode can be used as described above such that the number of filler messages is specified each time before the filler message sequence. For example, it is within the scope of this invention to provide a suitable message that precedes a group of filler messages, and to so convey information concerning the filler messages to the mobile terminal 10. However, the invention is not limited to this embodiment.

Another method, which requires less signalling from the base station 30 to the mobile terminal 10, uses a "semi-fixed" frame structure. By example, it is specified that there are always at least n consecutive filler messages and k other messages. The mobile terminal 10 than counts the k other messages (or measures a corresponding time), and thus knows when the n filler messages will begin. At this time the mobile terminal 10 can enter the sleep mode. In one embodiment the values of n and k can be fixed. In another embodiment the values of n and k can be varied during the operation of the system, and can thus be made adaptive as a function of system loading and other factors. In this latter case a message can be used to specify the values of at least one of n and k to the mobile terminal, and the specified values then remain in effect until changed by a later message. In this latter case it may also be desirable to specify some system default value for at least one of n and k, and to then subsequently change the values of n and k relative to the default value(s). It may also be desirable to employ more than one message for conveying the n and k value change information so as to guard against the loss of this information due to, for example, radio interference.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a user terminal of a type that is bidirectionally coupled to a system through a wireless interface, comprising the steps of:

receiving a message from the system, the message specifying at least in part a number of consecutive filler messages that will be transmitted; and placing the user terminal in a reduced power state for a period of time that is a function of the number of consecutive filler messages specified in the received message, wherein the message employs certain bits, that are specified as reserved bits, for specifying the number of consecutive filler messages that will be transmitted.

2. A method as set forth in claim 1, wherein the message is repeated a plurality of times during a message frame, and wherein the step of receiving receives at least one repeat of the message.

3. A method as set forth in claim 1, wherein the step of placing includes a step of programming a timer for the period of time.

4. A user terminal of a type that is bidirectionally coupled to a system through a wireless interface, comprising:

means for receiving a message from the system, the message specifying at least in part a number of consecutive filler messages that will be transmitted; and control means, responsive to the received message, for placing the user terminal in a reduced power state for a period of time that is a function of the number of consecutive filler messages specified in the received message, wherein the message employs certain bits, that are specified as reserved bits, for specifying the number of consecutive filler messages that are to be transmitted.

5. A user terminal as set forth in claim 4, wherein the message is repeated a plurality of times during a message frame, and wherein said receiving means receives at least one repeat of the message.

6. A user terminal as set forth in claim 4, wherein said control means includes means for programming a timer for the period of time.

7. A cellular telecommunications system comprising at least one base station and at least one user terminal that is bidirectionally coupled to said at least one base station through an RF interface, comprising:

means for composing messages and for transmitting said composed messages continuously over a forward RF link to said at least one user terminal, said messages including filler messages and other messages, wherein said composing means includes means for specifying in a transmitted message a number of filler messages that will be consecutively transmitted;

means in said user terminal for receiving messages from the forward RF link and for determining, from at least one received message, a number of consecutive filler messages that will be transmitted; and user terminal control means, responsive to said determining means, for placing the user terminal in a reduced power state for a period of time that is a function of the number of consecutive filler messages specified in said at least one received message, wherein the message employs certain bits, that are specified as reserved bits, for specifying the number of consecutive filler messages that will be transmitted.

8. A system as set forth in claim 7, wherein the message is repeated a plurality of times during a message frame, and wherein said receiving means receives at least one repeat of the message.

9. A system as set forth in claim 7, wherein said control means includes means for programming a timer for the period of time.

10. A system as set forth in claim 7, wherein the message specifies a number of consecutive filler messages and also a number of non-filler messages.

11. A cellular telecommunications system comprising at least one base station and at least one user terminal that is bidirectionally coupled to said at least one base station through an RF interface, comprising:

means for composing messages and for transmitting said composed messages continuously over a forward RF link to said at least one user terminal, said messages including filler messages and other messages, wherein said composing means includes means for grouping said messages as n consecutive filler messages and k consecutive non-filler messages; and means in said user terminal for receiving messages from the forward RF link, said receiving means including means for placing the user terminal in a reduced power state for a period of time that is a function of a time required to transmit said n consecutive filler messages.

12. A system as set forth in claim 11, wherein the values of n and k are fixed.

13. A system as set forth in claim 11, wherein the values of n and k are variable, and wherein said composing means is responsive to a change in value of at least one of n and k for composing and transmitting at least one message to said user terminal for indicating a current value of at least one of n and k, wherein said at least one message employs certain bits, that are specified as reserved bits, for indicating a current value of at least one of n and k.

14. A method for use in a communications system of a type that comprises at least one base station and at least one user terminal that is bidirectionally coupled to the at least one base station through a wireless interface, comprising steps of:

composing messages and transmitting the composed messages continuously over a forward wireless link from the base station to the at least one user terminal, the messages including filler messages and other messages and being grouped such that the messages are transmitted as n consecutive filler messages and k consecutive non-filler messages;

receiving messages from the forward RF link with the use terminal; and placing the user terminal into a reduced power state for a period of time that is a function of a time required to transmit at least the n consecutive filler messages.

15. A method as set forth in claim 14, wherein the values of n and k are fixed.

16. A method as set forth in claim 14, wherein at least one of the values of n and k is variable, and wherein the step of composing is responsive to a change in a value of at least one of n and k for composing and transmitting at least one message to the user terminal for specifying a current value of at least one of n and k, wherein said at least one message employs certain bits, that are specified as reserved bits, for indicating a current value of at least one of n and k.

* * * * *